US010360796B2

(12) United States Patent
Li et al.

(10) Patent No.: US 10,360,796 B2
(45) Date of Patent: Jul. 23, 2019

(54) TICKET-BASED TRAFFIC FLOW CONTROL AT INTERSECTIONS FOR INTERNET OF VEHICLES

(71) Applicant: Futurewei Technologies, Inc., Plano, TX (US)

(72) Inventors: Li Li, Bridgewater, NJ (US); Jiafeng Zhu, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 133 days.

(21) Appl. No.: 15/683,223

(22) Filed: Aug. 22, 2017

(65) Prior Publication Data

US 2018/0308354 A1 Oct. 25, 2018

Related U.S. Application Data

(60) Provisional application No. 62/489,145, filed on Apr. 24, 2017.

(51) Int. Cl.
*G01S 17/50* (2006.01)
*G01S 17/58* (2006.01)
(Continued)

(52) U.S. Cl.
CPC ..... *G08G 1/096775* (2013.01); *G08G 1/0116* (2013.01); *G08G 1/0145* (2013.01); *G08G 1/096708* (2013.01); *G08G 1/096741* (2013.01)

(58) Field of Classification Search
CPC ................ G08G 1/00; G08G 1/07–09; G08G 1/096775; G08G 1/0116; G08G 1/0145;
(Continued)

(56) References Cited

U.S. PATENT DOCUMENTS 8,386,156 B2 * 2/2013 Miller ..................... G08G 1/08 340/907
8,718,906 B2 * 5/2014 Miller ................ G08G 1/09626 340/907

(Continued)

FOREIGN PATENT DOCUMENTS

CN 101706992 A 5/2010
CN 106205172 A 12/2016

OTHER PUBLICATIONS

"IEEE STandard for Wireless Access in Vehicular Environments (WAVE)—Networking Services", IEEE Std 1609.3 tm-2016, approved Jan. 29, 2016, sponsored by Intelligent Transportation Systems Committee of the IEEE Vehicular Technology Society, Copyright 2016 The Institute of Electrical and Electronics Engineers, Inc., (2016), 160 pgs.

(Continued)

*Primary Examiner* — Yonel Beaulieu
(74) *Attorney, Agent, or Firm* — Schwegman Lundberg & Woessner, P.A.

(57) ABSTRACT

A computer-implemented method of controlling vehicle traffic through an intersection comprising: receiving a request, by one or more processors of a traffic flow controller and from each of a plurality of vehicles, to use the intersection; allocating, by the one or more processors and to a first subset of the plurality of vehicles, a first ticket to use the intersection; allocating, by the one or more processors and to a second subset of the plurality of vehicles, a second ticket to use the intersection; authorizing, by the one or more processors, the first subset of the plurality of vehicles to use the intersection; determining, by the one or more processors, that all vehicles of the first subset of the plurality of vehicles have cleared the intersection; and authorizing, by the one or (Continued)

more processors, the second subset of the plurality of vehicles to use the intersection.

20 Claims, 9 Drawing Sheets

(51) Int. Cl.

| | |
|---|---|
| ***G01S 17/93*** | (2006.01) |
| ***G08G 1/07*** | (2006.01) |
| ***G08G 1/08*** | (2006.01) |
| ***G08G 1/09*** | (2006.01) |
| ***G08G 1/16*** | (2006.01) |
| ***G01C 21/26*** | (2006.01) |
| ***G01C 21/34*** | (2006.01) |
| ***B60W 30/09*** | (2012.01) |
| ***B60W 30/17*** | (2012.01) |
| ***G08G 1/0967*** | (2006.01) |
| ***G08G 1/01*** | (2006.01) |

(58) Field of Classification Search
CPC ....... G08G 1/096708; G08G 1/096741; G08G 1/16; G01S 17/50; G01S 17/58; G01S 17/93; B60W 30/00; B60W 30/09; B60W 30/17; B60W 2550/20; B60W 2550/40; G01C 21/26; G01C 21/34; G01C 21/3691
See application file for complete search history.

(56) References Cited

U.S. PATENT DOCUMENTS

| | | | | |
|---|---|---|---|---|
| 8,976,041 | B2 * | 3/2015 | Buckel | G08G 1/08 340/933 |
| 9,013,225 | B2 * | 4/2015 | Madan | H03K 17/162 327/379 |
| 9,235,988 | B2 * | 1/2016 | Mimeault | G01S 17/58 |
| 9,969,326 | B2 * | 5/2018 | Ross | B60Q 1/50 |
| 9,984,570 | B2 * | 5/2018 | Yao | G08G 1/0112 |
| 9,997,074 | B2 * | 6/2018 | Kim | G08G 1/096783 |
| 2009/0109061 | A1 | 4/2009 | Mcnew et al. | |
| 2010/0191449 | A1 * | 7/2010 | Iwamoto | G08G 1/08 701/118 |
| 2012/0249343 | A1 * | 10/2012 | Thomas | G08G 1/096716 340/905 |
| 2013/0335238 | A1 * | 12/2013 | Matsur | G08G 1/08 340/906 |
| 2015/0009047 | A1 * | 1/2015 | Ashkenazi | G08G 1/144 340/932.2 |
| 2017/0032670 | A1 | 2/2017 | Poornachandran et al. | |
| 2018/0111611 | A1 * | 4/2018 | MacNeille | B60W 10/04 |
| 2019/0012912 | A1 * | 1/2019 | Kim | G08G 1/096783 |

OTHER PUBLICATIONS

Azimi, Seyed (Reza), et al., "Reliable Intersection Protocols Using Vehicular Networks", *2013 ACM/IEEE International Conference on Cyber-Physical Systems* (*ICCPS*), (2013), 1-10.
Bertsekas, Dimitri P., "Network Optimization: Continuous and Discrete Models", © 1998 Dimitri P. Bertsekas, Athena Scientific. Belmont, MA, (1998), 585 pgs.
Bui, Khac-Hoai Nam, et al., "Dynamic Traffic Light Control System Based on Process Synchronization Among Connected Vehicles", *Ambient Intelligence—Software and Applications—7th International Symposium on Ambient Intelligence* (*ISAmI 2016*), (2016), 77-85.
Gerla, Mario, et al., "Internet of Vehicles: From Intelligent Grid to Autonomous Cars and Vehicular Clouds", *2014 IEEE World Forum on Internet of Things* (*WF-IoT*), (2014), 241-246.
Huang, Qingfeng, et al., "The Design of Reliable Protocals for Wireless Traffic Signal System", Report No. WUCSE-2002-45, Washington University in St. Louis, (2002), 1-7.
Katrakazas, Christos, et al., "Real-time motion planning methods for autonomous on-road driving: State-of-the-art and future research directions", *Transportation Research Part C*. 60, (2015), 416-442.
Kenney, John B., et al., "Dedicated Short-Range Communications (DSRC) Standards in the United States", *Proceedings of the IEEE*, vol. 99, No. 7, (Jul. 2011), 1162-1182.
Magzhan, Kairanbay, et al., "A Review and Evaluations of Shortest Path Algorithms", *International Journal of Scientific & Technology Research*, 2(6), (Jun. 2013), 99-104.
Sniedovich, Moshe, et al., "Dijkstra's algorithm revisited: the dynamic programming connexion", *Control and Cybernetics*, 35(3), (2006), 599-620.
Stallings, William, "Chapter 9—Uniprocessors Scheduling", In: *Operating Systems—Internals and Design Principles*, Eighth Edition, Pearson Education, Inc.HA, (2015), 397-431.
Stallings, William, "Chapter 10—Multiprocessor, Multicore, and Real-Time Scheduling", In: *Operating Systems—Internals and Design Principles*, Eighth Edition, Pearson Education, Inc.HA, (2015), 432-476.
Stallings, William, "Chapter 11—I/O Management and Disk Scheduling", In: *Operating Systems—Internals and Design Principles*, Eighth Edition, Pearson Education, Inc.HA, (2015), 477-521.
Stallings, William, "Chapter 12—File Management", In: *Operating Systems—Internals and Design Principles*, Eighth Edition, Pearson Education, Inc.HA, (2015), 522-570.
Stallings, William, "Chapter 13—Embedded Opertaing Systems", In: *Operating Systems—Internals and Design Principles*, Eighth Edition, Pearson Education, Inc.HA, (2015), 571-589.
Stallings, William, "Chapter 14—Virtual Machines", In: *Operating Systems—Internals and Design Principles*, Eighth Edition, Pearson Education, Inc.HA, (2015), 590-613.
Stallings, William, "Chapter 15—Operating System Security", In: *Operating Systems—Internals and Design Principles*, Eighth Edition, Pearson Education, Inc.HA, (2015), 614-652.
Stallings, William, "Chapter 16—Distributed Processing, Cliet/Server, and Clusters", In: *Operating Systems—Internals and Design Principles*, Eighth Edition, Pearson Education, Inc.HA, (2015), 652-683.
Stallings, William, "Chapter 17—Network Protocols", In: *Operating Systems—Internals and Design Principles*, Eighth Edition, Pearson Education, Inc., (2015), 17-1-17-35.
Stallings, William, "Chapter 18—Distributed Process Management", In: *Operating Systems—Internals and Design Principles*, Eighth Edition, Pearson Education, Inc., (2015), 18-1-18-36.
Tacher, Remi, et al., "Revisiting Street Intersections Using Slot-Based Systems", *PLOS One*, (Mar. 16, 2016), 9 pgs.
Zhao, Biao, et al., "Real-Time Traffic Light Scheduling Algorithm Based on Genetic Algorithm and Machine Learning", *IOV 2015, LNCS 9502*, (2015), 385-398.
"International Application Serial No. PCT/CN2018/082804, International Search Report dated Jul. 6, 2018", 4 pgs.
"International Application Serial No. PCT/CN2018/082804, Written Opinion dated Jul. 6, 2018", 4 pgs.

* cited by examiner

| | R1 | R2 | R3 | R4 | R5 |
|---|---|---|---|---|---|
| F12 | 0 | 0 | 1 | 0 | 0 |
| F13 | 0 | 0 | 1 | 2 | 0 |
| F21 | 3 | 0 | 0 | 1 | 2 |
| F23 | 0 | 0 | 0 | 1 | 0 |
| F31 | 2 | 1 | 0 | 0 | 0 |
| F32 | 0 | 1 | 3 | 0 | 2 |

TICKET-BASED TRAFFIC FLOW CONTROL AT INTERSECTIONS FOR INTERNET OF VEHICLES

PRIORITY CLAIM

The application claims priority to U.S. Provisional Patent Application No. 62/489,145, filed Apr. 24, 2017, entitled "Ticket-Based Traffic Flow Control at Intersections for Internet of Vehicles," which is incorporated herein by reference in its entirety.

TECHNICAL FIELD

The present disclosure is related to the Internet of Vehicles and, in particular, to ticket-based traffic flow control at intersections for the Internet of Vehicles.

BACKGROUND

Traffic lights are a time-shared resource. Current traffic light control systems are not completely safe and yield low throughput. Intersections are involved in 45% of car crash injuries, contributing to 22% of all fatalities in the United States.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, there is provided a computer-implemented method of controlling vehicle traffic that comprises: receiving a request, by one or more processors of a traffic flow controller and from each of a plurality of vehicles, to use the intersection; allocating, by the one or more processors of the traffic flow controller and to a first subset of the plurality of vehicles, a first ticket to use the intersection; allocating, by the one or more processors of the traffic flow controller and to a second subset of the plurality of vehicles, a second ticket to use the intersection; authorizing, by the one or more processors of the traffic flow controller, the first subset of the plurality of vehicles to use the intersection; determining, by the one or more processors of the traffic flow controller, that all vehicles of the first subset of the plurality of vehicles have cleared the intersection; and authorizing, by the one or more processors of the traffic flow controller, the second subset of the plurality of vehicles to use the intersection.

Optionally, in any of the preceding aspects, the computer-implemented method further comprises receiving, by the one or more processors of the traffic flow controller, a location from each vehicle of the plurality of vehicles; and the allocating of the first ticket to the first subset of the plurality of vehicles is based on the locations of the vehicles.

Optionally, in any of the preceding aspects, each received request has a corresponding time at which the request was received; and the allocating of the first ticket to the first subset of the plurality of vehicles is based on the times at which the requests were received.

Optionally, in any of the preceding aspects, the computer-implemented method further comprises determining, by the one or more processors of the traffic flow controller, a wait time of each vehicle of the plurality of vehicles; and the allocating of the first ticket to the first subset of the plurality of vehicles is based on the wait times of the vehicles.

Optionally, in any of the preceding aspects, each vehicle of the plurality of vehicles has a corresponding speed; and the allocating of the first ticket to the first subset of the plurality of vehicles is based on the speeds of the vehicles.

Optionally, in any of the preceding aspects, each vehicle of the plurality of vehicles has a corresponding acceleration; and the allocating of the first ticket to the first subset of the plurality of vehicles is based on the accelerations of the vehicles.

Optionally, in any of the preceding aspects, each vehicle of the plurality of vehicles has a corresponding priority; and the allocating of the first ticket to the first subset of the plurality of vehicles is based on the priorities of the vehicles.

Optionally, in any of the preceding aspects, the computer-implemented method further comprises: receiving, by the one or more processors of the traffic flow controller, a message from each vehicle as the vehicle enters the intersection.

Optionally, in any of the preceding aspects, the computer-implemented method further comprises receiving, by the one or more processors of the traffic flow controller, a message from each vehicle as the vehicle exits the intersection.

According to one aspect of the present disclosure, a traffic flow controller is provided that comprises: a memory storage comprising instructions; one or more processors in communication with the memory storage, wherein the one or more processors execute the instructions to perform: receiving a request, from each of a plurality of vehicles, to use an intersection; allocating, to a first subset of the plurality of vehicles, a first ticket to use the intersection; allocating, to a second subset of the plurality of vehicles, a second ticket to use the intersection; authorizing the first subset of the plurality of vehicles to use the intersection; determining that all vehicles of the first subset of the plurality of vehicles have cleared the intersection; and authorizing the second subset of the plurality of vehicles to use the intersection.

Optionally, in any of the preceding aspects, the one or more processors further perform: receiving a location from each vehicle of the plurality of vehicles; and the allocating of the first ticket to the first subset of the plurality of vehicles is based on the locations of the vehicles.

Optionally, in any of the preceding aspects, each received request has a corresponding time at which the request was received; and the allocating of the first ticket to the first subset of the plurality of vehicles is based on the times at which the requests were received.

Optionally, in any of the preceding aspects, the one or more processors further perform: determining a wait time of each vehicle of the plurality of vehicles; and the allocating of the first ticket to the first subset of the plurality of vehicles is based on the wait times of the vehicles.

Optionally, in any of the preceding aspects, each vehicle of the plurality of vehicles has a corresponding speed; and the allocating of the first ticket to the first subset of the plurality of vehicles is based on the speeds of the vehicles.

Optionally, in any of the preceding aspects, each vehicle of the plurality of vehicles has a corresponding acceleration; and the allocating of the first ticket to the first subset of the plurality of vehicles is based on the accelerations of the vehicles.

Optionally, in any of the preceding aspects, each vehicle of the plurality of vehicles has a corresponding priority; and the allocating of the first ticket to the first subset of the plurality of vehicles is based on the priorities of the vehicles.

Optionally, in any of the preceding aspects, the one or more processors further perform: receiving a message from each vehicle as the vehicle enters the intersection.

Optionally, in any of the preceding aspects, the one or more processors further perform: receiving a message from each vehicle as the vehicle exits the intersection.

According to one aspect of the present disclosure, a non-transitory computer-readable medium is provided that stores computer instructions for controlling vehicle traffic through an intersection, wherein the instructions, when executed by one or more processors, cause the one or more processors to perform steps of: receiving a request, from each of a plurality of vehicles, to use the intersection; allocating, to a first subset of the plurality of vehicles, a first ticket to use the intersection; allocating, to a second subset of the plurality of vehicles, a second ticket to use the intersection; authorizing the first subset of the plurality of vehicles to use the intersection; determining that all vehicles of the first subset of the plurality of vehicles have cleared the intersection; and authorizing the second subset of the plurality of vehicles to use the intersection.

Optionally, in any of the preceding aspects, the one or more processors further perform: receiving a location from each vehicle of the plurality of vehicles; and the allocating of the first ticket to the first subset of the plurality of vehicles is based on the locations of the vehicles.

Any one of the foregoing examples may be combined with any one or more of the other foregoing examples to create a new embodiment within the scope of the present disclosure.

DETAILED DESCRIPTION

Figure 1:
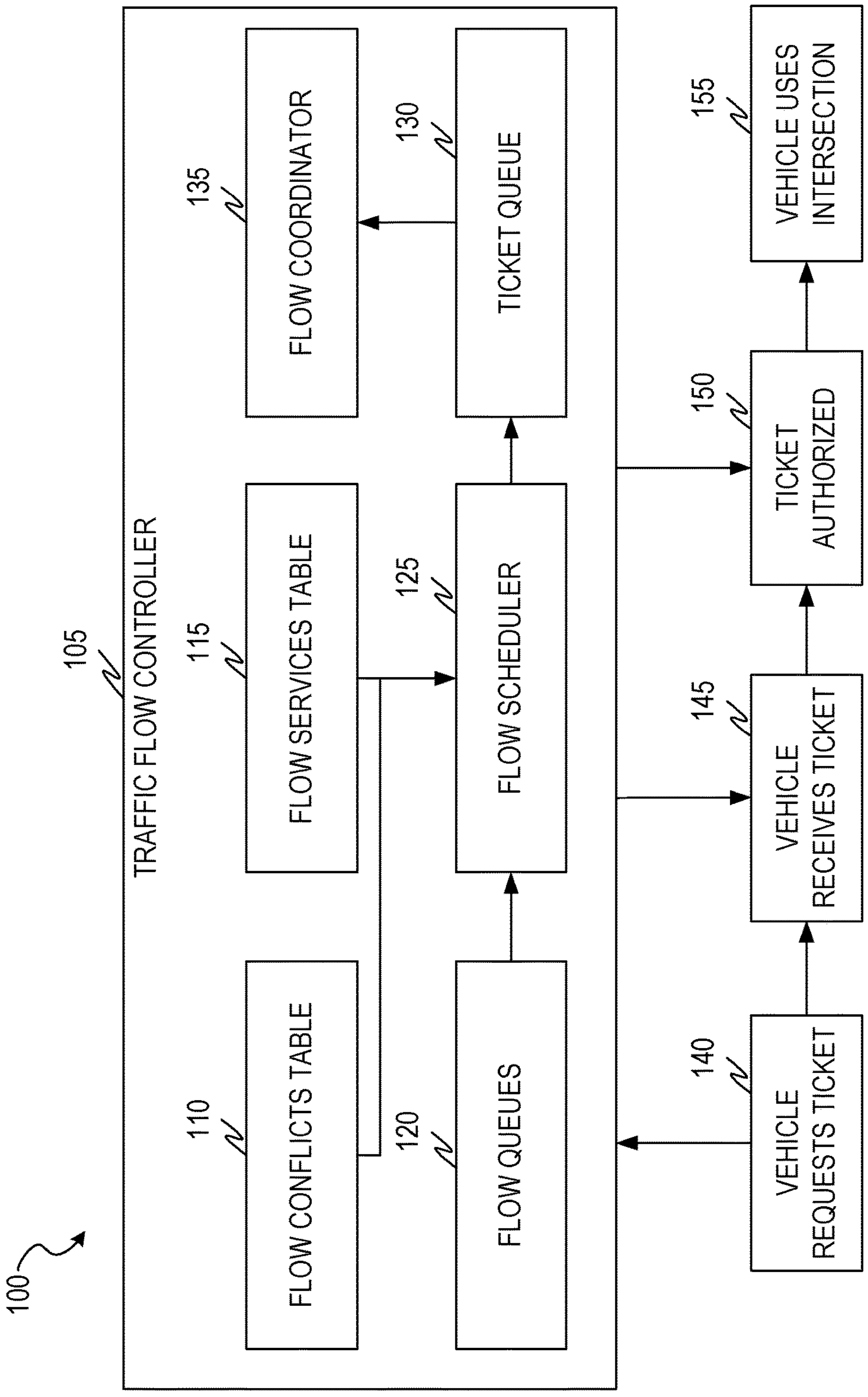
FIG. 1 is an illustration of communication between vehicles and a traffic flow controller, as well as processing within the traffic flow controller, in implementing ticket-based traffic flow control at intersections for the Internet of Vehicles, according to some example embodiments.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other type of processor operating on a computer system, such as a switch, server, or other computer system, turning such a computer system into a specifically programmed machine.

The Internet of Vehicles is a convergence of the mobile Internet and the Internet of Things. The Internet of Vehicles comprises vehicles fitted with or integrated with two-way radio frequency (RF) equipment. Internet of Vehicles technology refers to dynamic mobile communication systems that communicate between vehicles and public networks using V2V (vehicle-to-vehicle), V2R (vehicle-to-road), V2H (vehicle-to-human) and V2S (vehicle-to-sensor) interactions. It enables information sharing and the gathering of information on vehicles, roads and their surrounds. Moreover, it features the processing, computing, sharing and secure release of information onto information platforms. Based on this data, the system can effectively guide and supervise vehicles, and provide abundant multimedia and mobile Internet application services.

Intelligent transportation systems and the Internet of Vehicles (including autonomous vehicles) can replace traffic lights to improve safety, liveness, throughput, and fairness of intersections. Throughput is a measure of the number of cars traveling through an intersection in a unit of time. Liveness is a measure of the wait time for cars between queuing at an intersection and being authorized to use the intersection. Fairness is a measure of the deviation in wait times for different vehicles queuing to use the same intersection. Improvements in safety of an intersection reduce vehicle collisions in the intersection. Improvements in liveness of an intersection reduce the wait time for vehicles at the intersection. Improvements in throughput of an intersection increase the number of vehicles passing through the intersection each second. Improvements in fairness of an intersection reduce delay differences between vehicles of the same priority at the intersection.

Control of vehicles passing through an intersection may be considered as an admission control problem. In an admission control problem, a set of requests to use one or more resources is received. A permissible schedule is a set of assignments for permission to use the resources such that no resource exceeds 100% usage at any time. For an intersection, the resources are portions of the intersection, each of which may contain at most one vehicle without collision. Thus, vehicles taking non-intersecting paths through the intersection may use the intersection (with different resources for the different portions of the intersection used) simultaneously, but vehicles taking intersecting paths through the intersection must take turns.

Vehicles intending to pass through an intersection request a ticket from a traffic controller for the intersection. The traffic controller issues tickets based on one or more of each vehicle's priority, speed, location, acceleration, direction, time of request, and time waiting at the intersection. In various example embodiments, a ticket is implemented as a 32-bit value, a 64-bit value, an alphanumeric string, or any suitable combination thereof. The traffic controller permits all vehicles with the same ticket to enter the intersection simultaneously. Once through the intersection, each vehicle informs the traffic controller that the vehicle has left the intersection. When all vehicles with the same ticket have informed the traffic controller that they have left the intersection, the traffic controller permits the vehicles with the next ticket to use the intersection.

FIG. 1 is an illustration 100 of communication between vehicles and a traffic flow controller, as well as processing within the traffic flow controller, in implementing ticket-based traffic flow control at intersections for Internet of Vehicles, according to some example embodiments. The illustration 100 depicts a traffic flow controller 105 and events 140, 145, 150, and 155. The traffic flow controller 105 includes a flow conflicts table 110, a flow services table 115, flow queues 120, a flow scheduler 125, a ticket queue 130, and a flow coordinator 135.

In event 140, a vehicle requests a ticket from the traffic flow controller 105 before entering the intersection. In event 145, the vehicle receives a ticket from the traffic flow controller 105. Other vehicles assigned the same ticket will be permitted to use the intersection at the same time as the vehicle that requested the ticket in event 140. For example, two vehicles may both be able to turn right simultaneously, and thus be assigned the same ticket by the traffic flow controller 105. In event 150, the vehicle receives a ticket authorization from the traffic flow controller 105. In event 155, the vehicle uses the intersection. The vehicle may inform the traffic flow controller 105 of the vehicle's movement when entering the intersection and when leaving the intersection.

The traffic flow controller 105 runs the flow scheduler 125. The flow scheduler 125 uses the flow queues 120, the flow conflicts table 110, and the flow service table 115 as inputs and generates the ticket queue 130 as an output. The flow coordinator 135 takes the ticket queue 130 as an input and communicates with vehicles to coordinate their flow through the intersection.

The flow queues 120 are queues of vehicles requesting tickets for access to the intersection. In some example embodiments, one queue is used for each flow through the intersection. A flow through an intersection is defined by a particular starting point and ending point. For example, in a two-lane, four-way intersection (depicted in the digital map 610 of FIG. 6, described below), a Northbound vehicle may turn right, go straight, or turn left. Each of these three options is a separate flow. Similarly, three options exist for incoming vehicles from the South, West, and East. Thus, there are twelve flows through the intersection, assuming no U-turns are allowed. Other intersections may have more or fewer flows. For example, a T-intersection (depicted in the digital map 510 of FIG. 5, described below) has three starting points with two ending points each, for a total of six flows. As another example, a four-way intersection with two lanes in each direction, wherein vehicles may turn right from the right lane, turn left from the left lane, and go straight from either lane, would have four flows per incoming direction, for a total of sixteen flows.

The flow conflicts table 110 contains data that indicates which flows conflict. For example, Northbound traffic going straight through a four-way intersection conflicts with Westbound traffic going straight through the intersection, but not with Southbound traffic going straight or turning right.

The flow service table 115 contains data that indicates a length of time for each flow. For example, flows for vehicles turning right may take less time than flows for vehicles turning left. The length of time for the flow being used by a particular vehicle is referred to as the service time for that vehicle.

The flow coordinator 135 accesses the ticket queue 130 and sends a message to each vehicle assigned a current ticket to authorize the vehicle to use the intersection. The current ticket is the ticket assigned to vehicles that are currently allowed to use the intersection. Tickets assigned to vehicles that were previously allowed to use the intersection are expired tickets. Tickets assigned to vehicles that have not yet been allowed to use the intersection are pending tickets.

The vehicles inform the flow coordinator 135 when they enter and leave the intersection. When all authorized vehicles have left the intersection, the flow coordinator 135 updates the current ticket and sends a message to each vehicle having the updated current ticket to indicate that the vehicle may use the intersection. By repetition of this process, vehicles are allowed to use the intersection in the manner scheduled by the flow scheduler.

The vehicles may communicate with the flow scheduler 125, the flow coordinator 135, or both using an integrated computing device communicating over a wireless communication network. The traffic flow controller 105 may be a dedicated server for the intersection or a centralized server controlling traffic for multiple intersections. The traffic flow controller 105 may be implemented using circuitry of the computer 700, described below with respect to FIG. 7.

Figure 2:
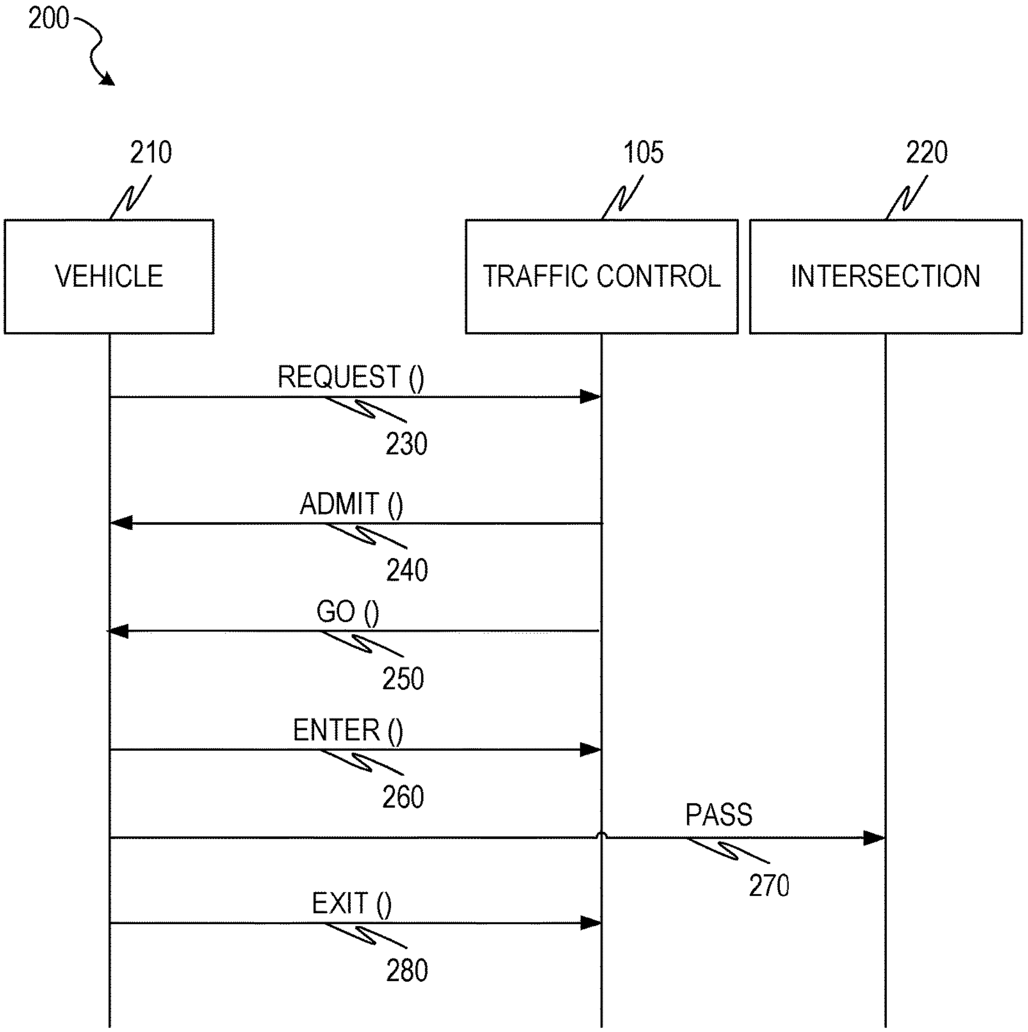
FIG. 2 is an illustration of communication between vehicles and a traffic flow controller, in implementing ticket-based traffic flow control at intersections for the Internet of Vehicles, according to some example embodiments.

FIG. 2 is an illustration 200 of communication between a vehicle 210 and a traffic flow controller 105, in implementing ticket-based traffic flow control at an intersection 220 for the Internet of Vehicles, according to some example embodiments. The illustration 200 includes communications 230, 240, 250, 260, and 280, as well as event 270.

In communication 230, the vehicle 210 sends a request to the traffic flow controller 105 for a ticket to use the intersection 220. In some example embodiments, the request includes a vehicle identifier, an entry point identifier (also referred to as an initial identifier) of the intended flow, an exit point identifier (also referred to as a final identifier) of the intended flow, a location of the vehicle at the time of the request, a direction of the vehicle at the time of the request, a speed of the vehicle at the time of the request, an acceleration of the vehicle at the time of the request, or any suitable combination thereof.

In communication 240, the traffic flow controller 105 responds to the request with an admit message. In some example embodiments, the admit message includes the entry point identifier, the exit point identifier, the vehicle identifier, a ticket identifier, or any suitable combination thereof. The admit message informs the vehicle 210 that it will be permitted to use the intersection along with other vehicles given the same ticket.

In communication 250, when the ticket assigned to the vehicle 210 in the communication 240 becomes the current ticket, the traffic flow controller 105 sends a go message to all vehicles having the ticket. In some example embodiments, the go message includes an entry point identifier, a vehicle identifier, a ticket identifier, or any suitable combination thereof. The go message informs the vehicle that it is now permitted to use the intersection.

In communication 260, the vehicle sends an enter message to the traffic flow controller 105. In some example embodiments, the enter message includes the entry point identifier, the exit point identifier, the vehicle identifier, a ticket identifier, or any suitable combination thereof. The enter message informs the traffic flow controller that the vehicle is entering the intersection.

In event 270, the vehicle 210 passes through the intersection. Other vehicles having the same ticket may pass through the intersection concurrently. Vehicles with pending tickets wait.

In communication 280, the vehicle 210 sends an exit message to the traffic flow controller 105. In some example embodiments, the exit message includes the entry point identifier, the exit point identifier, the vehicle identifier, a ticket identifier, or any suitable combination thereof. The exit message informs the traffic flow controller 105 that the vehicle 210 is exiting the intersection.

Thus, using the ticket-based traffic control protocol of FIG. 2, vehicles with the same ticket (e.g., k) can enter the intersection concurrently. Vehicles with the next ticket (e.g., k+1) wait for vehicles with the previous ticket (k) to exit the intersection before entering.

Figure 3:
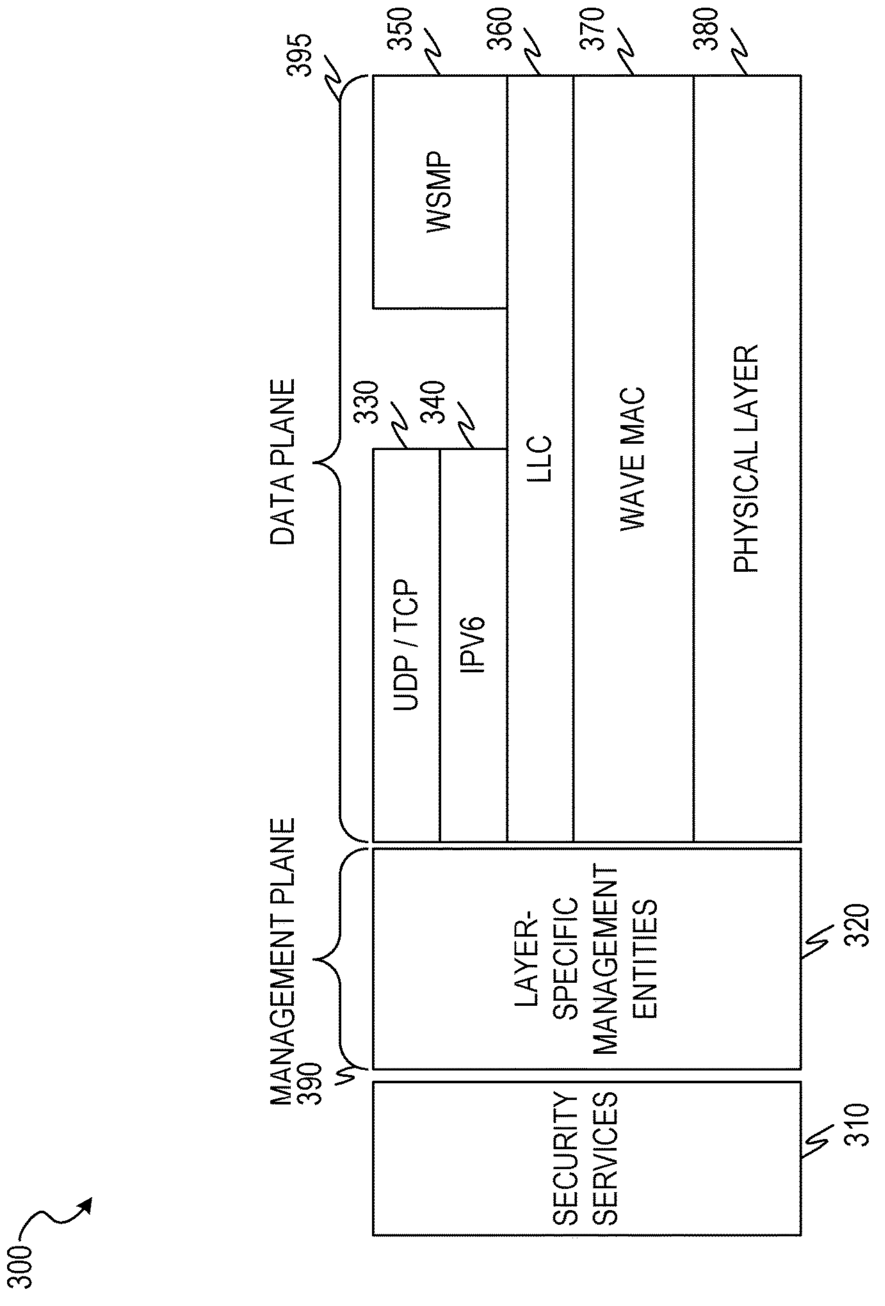
FIG. 3 is an illustration of a communication protocol for use between vehicles and a traffic flow controller, in implementing ticket-based traffic flow control at intersections for the Internet of Vehicles, according to some example embodiments.

FIG. 3 is an illustration of an embodiment of a communication protocol 300 for use between vehicles and a traffic flow controller, in implementing ticket-based traffic flow control at intersections for the Internet of Vehicles, according to some example embodiments. The communication protocol 300 includes security services 310, a management plane 390 that includes layer-specific management entities 320, and a data plane 395. The data plane 395 includes user datagram protocol (UDP) and transmission control protocol (TCP) layer 330, Internet Protocol (IP) version 6 (v6) layer 340, wireless access in vehicular environment (WAVE) short message protocol (WSMP) layer 350, logical link control (LLC) sublayer 360, WAVE standard for media access control (MAC) layer 370, and physical layer 380. In some example embodiments, the communication protocol 300 uses one or more licensed 75 MHz spectra in the 5.8 GHz frequency band.

The physical layer 380 of the data plane 395 defines the interface between the communication medium and the physical devices, and conforms to IEEE standard 802.11p. The WAVE MAC layer 370 also conforms to IEEE standard 802.11p. Features of the WAVE MAC layer 370 include channel coordination and routing, multi-channel synchronization, and MAC-layer readdressing in support of pseudonymity. The LLC sublayer 360 is the upper sublayer of the data link layer and conforms to IEEE standard 802.2. The WSMP layer 350 conforms to IEEE standard 1609.3. IPv6 layer 340 and the UDP/TCP layer 330 conform to Internet Engineering Task Force (IETF) requests for comments (RFC) 793 and 2460.

The layer-specific management entities 320 and security services 310 comply with IEEE standard 1609.3. IEEE 802.11p, 802.2, 1609.3, and 1609.4 are hereby incorporated by reference in their entirety. IETF RFC 793 and 2460 are hereby incorporated by reference in their entirety.

Applications may interact with the management plane 390 and the data plane 395 using the dedicated short range communications (DSRC) message set dictionary provided by SAE International in combination with the ticket-based traffic control protocol of FIG. 2.

In some example embodiments, the communication protocol 300 uses IEEE standards for vehicle-to-infrastructure (V2I) and vehicle-to-vehicle (V2V) communications. The control messages (e.g., the messages of FIG. 2) between the traffic flow controller and a vehicle may be sent using the WSMP layer 350 or TCP/IP (e.g., the UDP/TCP layer 330). The control messages may also be sent using an extension to DSRC message types. Control messages indicate an action, a vehicle identifier, a location identifier, a ticket, a latitude, a longitude, a heading, a speed, an acceleration, or any suitable combination thereof. In some example embodiments, the action is indicated in one byte, the vehicle identifier is indicated in 10 bytes, the location identifier is indicated in three bytes (e.g., as an intersection number within a zip code), the ticket is identified by an 8-byte long integer, the location is identified as an 8-byte longitude/latitude pair, the heading is indicated as a 2-byte value, the speed is indicated as a 2-byte value, the acceleration is indicated as a 7-byte value, or any suitable combination thereof.

Figure 4:
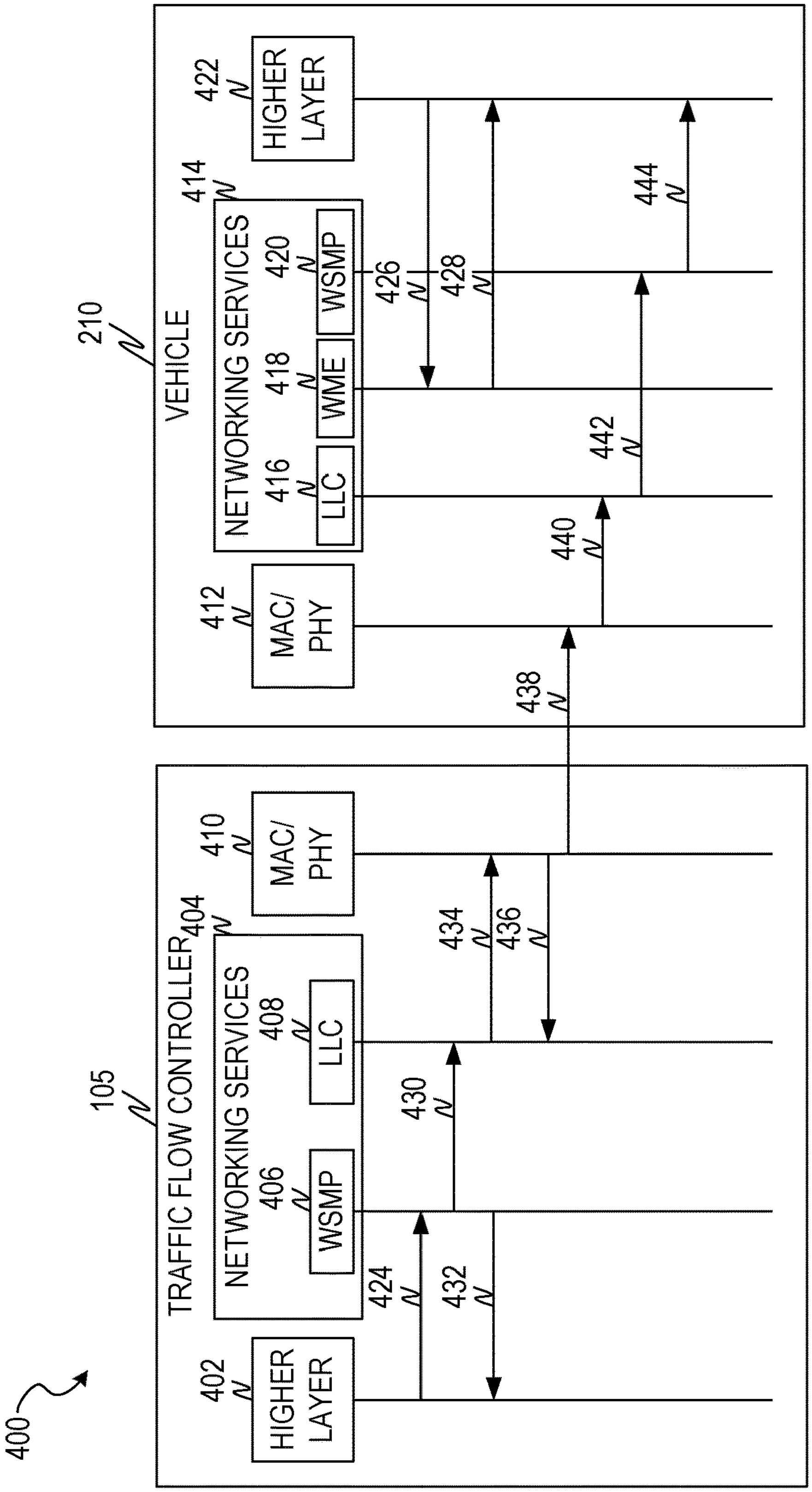
FIG. 4 is an illustration of communication between vehicles and a traffic flow controller, in implementing ticket-based traffic flow control at intersections for the Internet of Vehicles, according to some example embodiments.

FIG. 4 is an illustration 400 of communication between a traffic flow controller 105 and a vehicle 210 in implementing ticket-based traffic flow control at intersections for the Internet of Vehicles, according to some example embodiments. Within the traffic flow controller 105 are shown a higher layer 402, networking services 404, and a MAC/physical layer 410. Within the vehicle 210 are shown a MAC/physical layer 412, networking services 414, and a higher layer 422. The networking services 404 include WSMP 406 and LLC 408. The networking services 414 include LLC 416, WAVE management entity (WME) 418, and WSMP 420. FIG. 4 shows communications 424, 426, 428, 430, 432, 434, 436, 438, 440, 442, and 444. The communications are within the traffic flow controller 105, within the vehicle 210, and between the traffic flow controller 105 and the vehicle 210. As shown in FIG. 4, the connection between the traffic flow controller 105 and the vehicle 210 are made at the MAC/physical layer (i.e., between the MAC/physical layer 410 of the traffic flow controller 105 and the MAC/physical layer 412 of the vehicle 210). Specific communication messages in the description below are defined by IEEE 1609.3, 1609.4, and 802.11.

Regarding the communications within the traffic flow controller 105, the higher layer 402 sends communication 424, a WSM-WaveShortMessage.request, to the WSMP 406, requesting generation of a message using the WSMP 406. The WSM-WaveShortMessage.request may include a channel identifier, a data rate, a transmit power level, a provider service identifier, a user priority, a WSM expiration time, a length, data to be transferred, a destination MAC address, WSMP header extensions, a WAVE element identifier, or any suitable combination thereof.

In response to receiving the WSM-WaveShortMessage.request, the WSMP 406 sends communication 432, a WSM-WaveShortMessage.confirm message, to the higher layer 402 to confirm receipt of the WSM-WaveShortMessage.request. The WSMP 406 also sends communication 430, a DL-UNITDATAX.request, to the LLC. The DL-UNITDATAX.request may include a channel identifier, a data rate, a transmit power level, a provider service identifier, a user priority, a WSM expiration time, a length, data to be transferred, a destination MAC address, WSMP header extensions, a WAVE element identifier, or any suitable combination thereof.

In response to receiving the DL-UNITDATAX.request, the LLC 408 sends communication 434, a MA-UNITDATAX.request, to the MAC/physical layer 410. The MA-UNITDATAX.request may include a channel identifier, a data rate, a transmit power level, a WSM expiration time, a source MAC address, a destination MAC address, routing information, data to be transferred, a user priority, a service class, or any suitable combination thereof.

In response to receiving the MA-UNITDATAX.request, the MAC/physical layer 410 sends communication 436, a MA-UNITDATAX.confirm, to the LLC 408 to confirm receipt of the MA-UNITDATAX.request. The MAC/physical layer 410 of the traffic flow controller 105 also communicates the data via WSM to the MAC/physical layer 412 of the vehicle 210 in communication 438.

Regarding the communications within the traffic flow controller, the higher layer 422 sends communication 426, a WME-WsmRequest.request (e.g., as defined in IEEE 1609.3 Section 7.5.2), to the WME 418 requesting generation of a message using the WME 418. The WME-WSMRequest.request may include a source address, a destination address, data, a channel identifier, a time slot, a data rate, a transmit power level, channel load, an expiration time, or any suitable combination thereof.

In response to receiving the WME-WsmRequest.request, the WME 418 sends a WME-WsmRequest.confirm message to the higher layer 422 to confirm receipt of the WME-WsmRequest.request.

Regarding the receipt of the WSM data from the MAC/physical layer 410 of the traffic flow controller 105, the MAC/physical layer 412 of the vehicle 210 sends communication 440, a MA-UNITDATA.indication, to the LLC 416 of the vehicle 210. The MA-UNITDATA.indication may include a source MAC address, a destination MAC address, routing information, data received, reception status, a user priority, a service class, or any suitable combination thereof.

In response to receiving the MA-UNITDATA.indication, the LLC 416 sends communication 442, a DL-UNITDATA.indication, to the WSMP 420. The DL-UNITDATA.indication may include a source MAC address, a destination MAC address, data received, a user priority, or any suitable combination thereof.

In response to receiving the DL-UNITDATA.indication, the WSMP 420 sends a WSM-WaveShortMessage.indicator to the higher layer 422. The WSM-WaveShortMessage.indication, defined in IEEE 1609.3 Section 7.3.4, may include a source MAC address, a destination MAC address, routing information, data received, reception status, a user priority, a service class, or any suitable combination thereof.

The higher layer 422 of the vehicle 210 may receive the WSM-WaveShortMessage.indicator and extract the data received from the traffic flow controller 105 for processing. For example, the admit message or go message shown in FIG. 2 may be received and handled by the vehicle 210.

Figure 5:
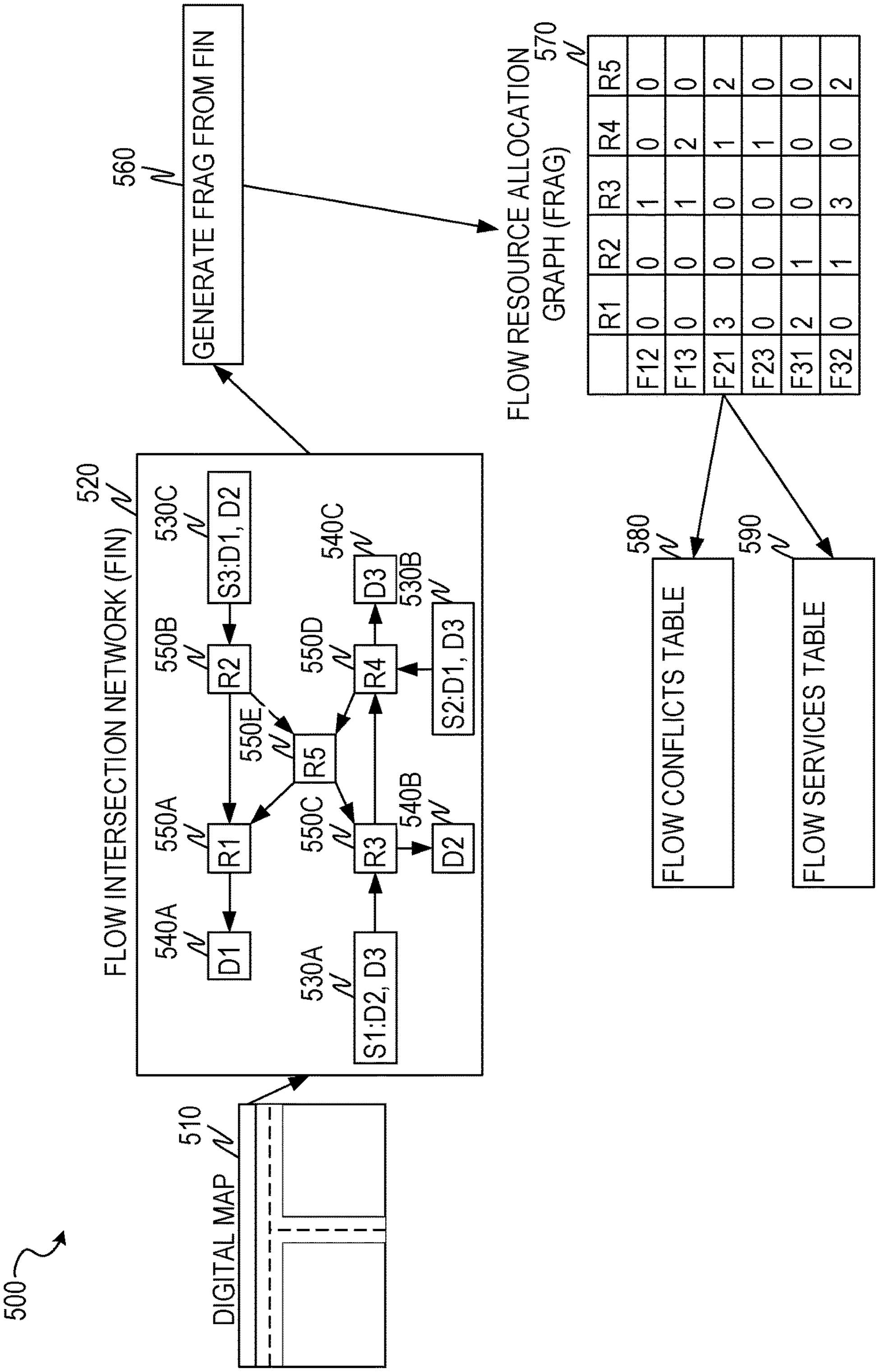
FIG. 5 is an illustration of processing within a traffic flow controller in implementing ticket-based traffic flow control at intersections for the Internet of Vehicles, according to some example embodiments.

FIG. 5 is an illustration 500 of processing within a traffic flow controller in implementing ticket-based traffic flow control at intersections for the Internet of Vehicles, according to some example embodiments. FIG. 5 includes a digital map 510, which is used to generate a flow intersection network (FIN) 520 that includes source nodes 530A, 530B, and 530C (also referred to as entry nodes), destination nodes 540A, 540B, and 540C (also referred to as exit nodes), and resource nodes 550A, 550B, 550C, 550D, and 550E. The FIN 520 is analyzed using the operations 560 to create a flow resource allocation graph (FRAG) 570. The FRAG 570 is used to generate a flow conflicts table 580 and a flow services table 590.

The operations 560 include initializing each cell of the FRAG matrix to 0, determining, for each row $F_{ij}$, the resource nodes used in the path from entry node i to exit node j, and setting the cells of the FRAG matrix corresponding to the used nodes to a non-zero value. In some example embodiments, Dijkstra's shortest path algorithm is used to determine the resource nodes used in each path. The non-zero value used in the FRAG matrix may be equal to the position of the resource node in the path. For example, if the path from entry node 3 to exit node 1 is R2 followed by R1, the R2 cell in the row F31 may be set to 1 and the R1 cell may be set to 2.

The digital map 510 shows a T intersection with one lane in each direction at each side of the intersection. For discussion purposes, the digital map 510 is considered to be oriented with North at the top. Based on the digital map 510, the traffic flow controller 105 identifies the three entry nodes 530A-530C, the three exit nodes 540A-540C, and the five resource nodes 550A-550E. A pair comprising an entry node and an exit node defines a traffic flow. For example, S3:D1 represents a traffic flow from the third entry node to the first exit node. In the example of FIG. 5, the S3:D1 traffic flow is a Westbound straight flow through the top of the T.

In some example embodiments, fewer than all possible pairs of entry nodes and exit nodes are used as traffic flows. For example, U-turns may be prohibited at an intersection, preventing traffic flows that allow a vehicle to leave the intersection heading the opposite direction from which it entered. As another example, certain lanes may have turn restrictions, preventing traffic flows that begin in those lanes from leaving in a direction that requires a restricted turn.

The resource nodes 550A-550E represent portions of the intersection such that so long as no resource node is used by more than one vehicle at a time, no collisions will occur. A FIN (e.g., a directed graph) represents the possible sequence of resource node usage in the traffic flows. Thus, a vehicle may move from R3 to R4 (travelling East through the intersection), but not from R4 to R3 (which would represent travelling West through the Eastbound lane).

Using the FIN 520, the traffic flow controller 105 generates the FRAG 570. The FRAG 570 indicates the sequence of resource nodes used by each traffic flow. In the example FRAG 570, the FRAG 570 contains one row for each traffic flow and one column for each resource, although other methods of representing the sequence of resource nodes used by each traffic flow may be used. The value of each cell is 0 if the traffic flow of the row does not use the resource of the column, or a number that indicates the position of the resource in the sequence of the traffic flow if the traffic flow does use the resource.

One method of generating the FRAG 570 is shown in the operations 560, though other methods may be used. In the example operations 560, the FRAG 570 is created with one row for each traffic flow and one column for each resource node, and all cells of the FRAG 570 are initialized to 0. Dijkstra's Shortest Path algorithm is used to find the shortest path from the entry node to the exit node for the first traffic flow. The cell for each resource node on the shortest path for the first traffic flow is set to be equal to the position of that resource node in the shortest path. The last two steps are repeated for every other traffic flow in the FRAG 570.

An example formula for calculating $D[F_{ij}]$, the distance travelled by a vehicle in following the traffic flow beginning at entry node i and ending at exit node j, is:

$$D[F_{ij}] = d(S_i, R_{M_{ij}(1)}) + d(R_{M_{ij}(max(FRAG[F_{ij}]))}, D_j) + \sum_{i=1}^{max(FRAG[F_{ij}])} d(R_{M_{ij}(i)}) + \sum_{i=1}^{max(FRAG[F_{ij}])-1} d(R_{M_{ij}(i)}, R_{M_{ij}(i+1)})$$

The formula shows four elements summed together. The first element is the distance from the entry node to the first resource node in the traffic flow. The second element is the distance from the last resource node in the traffic flow to the exit node. The third element is the sum of the distances traversed within each resource node in the traffic flow. The fourth element is the sum of the distances between the resource nodes in the traffic flow.

The traffic flow controller 105 generates the flow conflicts table 580 using the FRAG 570. The flow conflicts table 580 identifies traffic flows that cannot be performed simultaneously. Traffic flows that can be performed simultaneously are referred to as concurrent traffic flows. As an example, a Westbound vehicle cannot turn left across an intersection at the same time an Eastbound vehicle drives straight through the intersection. In some example embodiments, the flow conflicts table includes one row and one column for each traffic flow. The cell at the intersection of two traffic flows is set to 0 if the two traffic flows are concurrent and non-zero if the two traffic flows are non-concurrent.

Though other algorithms may be used, an example algorithm to generate the flow conflicts table is:

```
For F_i in F
  For F_j in F
    C[F_i, F_j] = FRAG[F_i] ·FRAG[F_j]
```

In the algorithm above, each cell in the flow conflicts table 580 (representing the concurrency of two traffic flows) is set equal to the dot product of the rows in the FRAG 570 representing the two traffic flows. The dot product of two rows in the FRAG 570 will be zero if and only if the two traffic flows do not make use of any of the same resource nodes. Thus, using the example algorithm above in the example of FIG. 5, the flow conflicts table 580 would be:

| | F12 | F13 | F21 | F23 | F31 | F32 |
|---|---|---|---|---|---|---|
| F12 | x | 1 | 0 | 0 | 0 | 3 |
| F13 | 1 | x | 2 | 0 | 0 | 3 |
| F21 | 0 | 2 | x | 1 | 6 | 4 |
| F23 | 0 | 0 | 1 | x | 0 | 0 |
| F31 | 0 | 0 | 6 | 0 | x | 1 |
| F32 | 3 | 3 | 4 | 0 | 1 | x |

The traffic flow controller 105 also generates the flow service table 590 using the FRAG 570. The flow service table 590 identifies an estimated time for a vehicle to complete a given traffic flow. In some example embodiments, the flow service table 590 includes one row for each traffic flow, with one value for each row.

Although other equations may be used, an example equation to generate the flow service table is:

$$S[F_{ij}] = \frac{\sqrt{u^2 + 2aD[F_{ij}]} - u}{a}$$

In the example equation, $S[F_{ij}]$ represents the time a vehicle takes to complete the traffic flow from entry point i to exit point j. The other elements in the equation are $D[F_{ij}]$, the total distance of the traffic flow; u, the speed of the vehicle; and a, the acceleration of the vehicle.

Any of the machines or devices shown in FIGS. 1-5 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 7. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIGS. 1-5 may be combined into a single machine, database, or device, and the functions described herein for any single machine, database, or device may be subdivided among multiple machines, databases, or devices.

Figure 6:
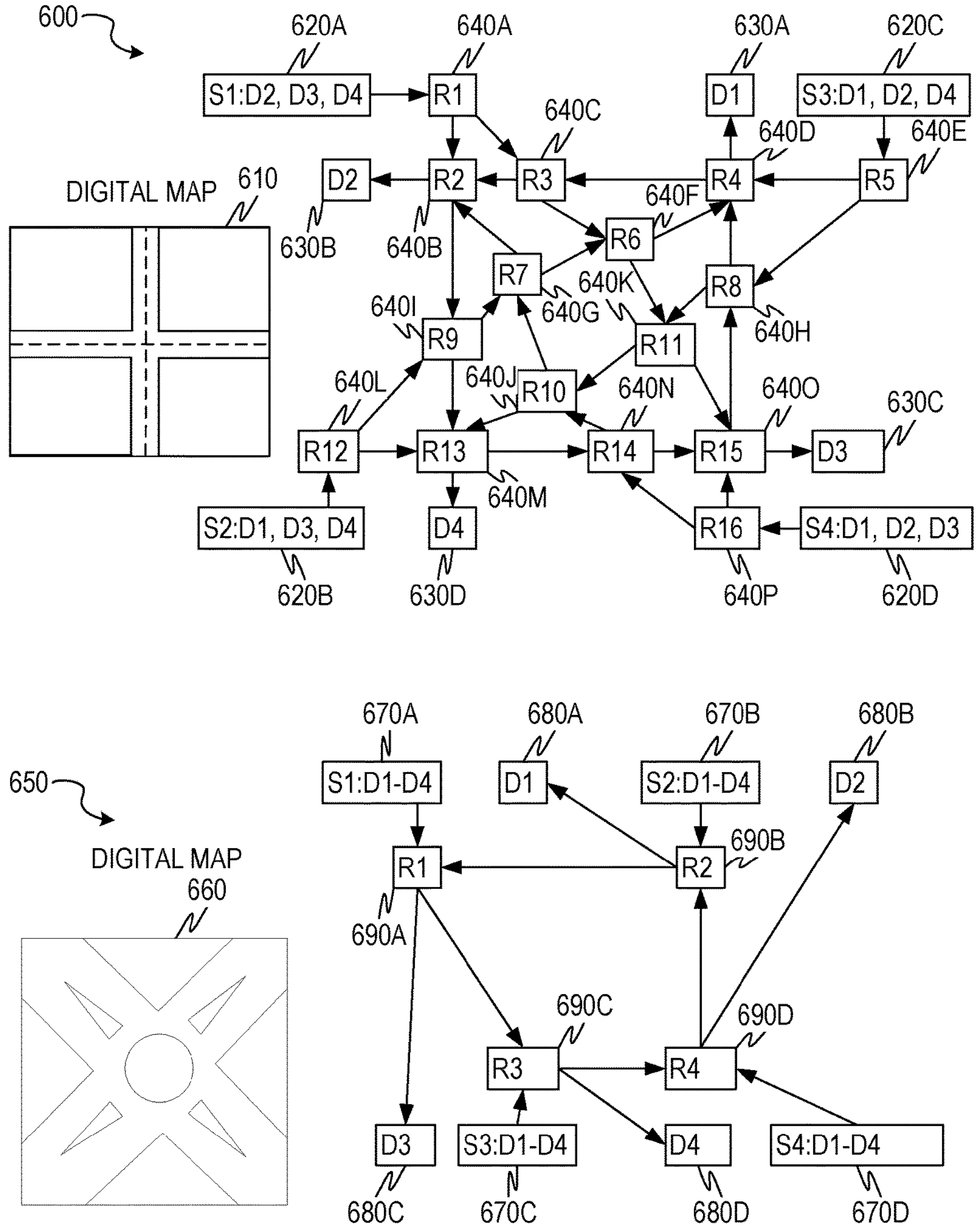
FIG. 6 is an illustration of flow intersection networks for use in implementing ticket-based traffic flow control at intersections for the Internet of Vehicles, according to some example embodiments.

FIG. 6 is an illustration of flow intersection networks for use in implementing ticket-based traffic flow control at intersections for the Internet of Vehicles, according to some example embodiments. Shown in FIG. 6 are example scenarios 600 and 650. In scenario 600, a digital map 610 depicts a cross intersection. A FIN for the digital map 610 includes entry nodes 620A, 620B, 620C, and 620D, exit nodes 630A, 630B, 630C, and 630D, and resource nodes 640A, 640B, 640C, 640D, 640E, 640F, 640G, 640H, 640I, 640J, 640K, 640L, 640M, 640N, 640O, and 640P. In scenario 650, a digital map 660 depicts a roundabout intersection. A FIN for the digital map 660 includes entry nodes 670A, 670B, 670C, and 670D, exit nodes 680A, 680B, 680C, and 680D, and resource nodes 690A, 690B, 690C, and 690D.

The FIN for the digital map 610 has four entry nodes 620A-620D (labelled S1-S4), four exit nodes 630A-630D (labelled D1-D4), and sixteen resource nodes 640A-640P (labelled R1-R16). Each entry can reach three exits, so the cross intersection has 4×3=12 distinct flow paths. For discussion purposes, the digital map 610 is considered to be oriented with North at the top.

The FIN for the digital map 650 has four entry nodes 670A-670D (labelled S1-S4), four exit nodes 680A-680D (labelled D1-D4), and four resource nodes 690A-690D (labelled R1-R4). Each entry can reach four exits, so the roundabout intersection has 4×4=16 distinct flow paths. For discussion purposes, the digital map 650 is considered to be oriented with North at the top.

Figure 7:
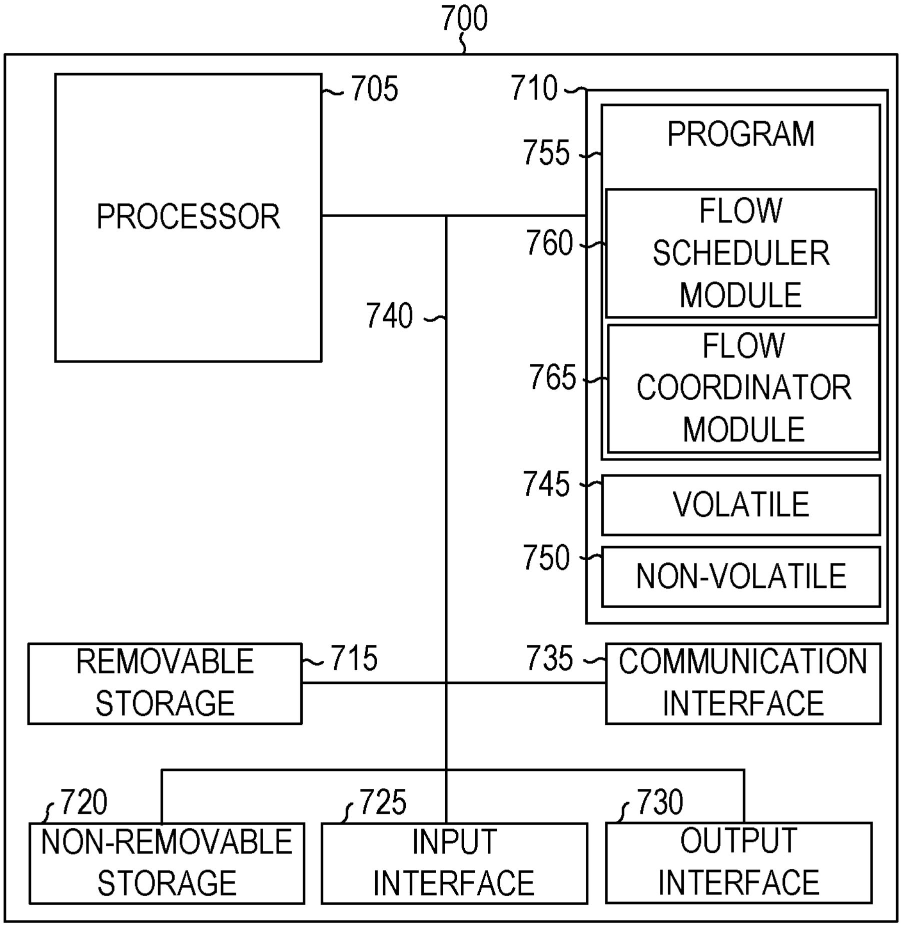
FIG. 7 is a block diagram illustrating circuitry for clients and servers that implement algorithms and perform methods, according to some example embodiments.

FIG. 7 is a block diagram illustrating circuitry for implementing algorithms and performing methods, according to example embodiments. All components need not be used in various embodiments. For example, an on-board vehicle computer and a traffic flow controller may each use a different set of components or, in the case of servers, for example, larger storage devices.

One example computing device in the form of a computer 700 (also referred to as computing device 700 and computer system 700) may include a processor 705, memory storage 710, removable storage 715, non-removable storage 720, input interface 725, output interface 730, and communication interface 735, all connected by a bus 740. Although the example computing device is illustrated and described as the computer 700, the computing device may be in different forms in different embodiments. For example, the computing device may instead be a smartphone, a tablet, a smartwatch, or another computing device including elements the same as or similar to those illustrated and described with regard to FIG. 7. Devices, such as smartphones, tablets, and smartwatches, are generally collectively referred to as "mobile devices" or "user equipment." Further, although the various data storage elements are illustrated as part of the computer 700, the storage may also or alternatively include cloud-based storage accessible via a network, such as the Internet, or server-based storage.

The memory storage 710 may include volatile memory 745 and non-volatile memory 750, and may store a program 755. The computer 700 may include, or have access to a computing environment that includes, a variety of computer-readable media, such as the volatile memory 745, the non-volatile memory 750, the removable storage 715, and the non-removable storage 720. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD-ROM), digital versatile disks (DVD) or other optical disk storage, magnetic cassettes, magnetic tape, magnetic disk storage or other magnetic storage devices, or any other medium capable of storing computer-readable instructions.

The computer 700 may include or have access to a computing environment that includes input interface 725, output interface 730, and a communication interface 735. The output interface 730 may be an interface to a display device, such as a touchscreen, that also may serve as an input device. The input interface 725 may be an interface to one or more of a touchscreen, a touchpad, a mouse, a keyboard, a camera, one or more device-specific buttons, one or more sensors integrated within or coupled via wired or wireless data connections to the computer 700, and other input devices. The computer 700 may operate in a networked environment using the communication interface 735 to connect to one or more remote computers, such as database servers. The remote computer may include a personal computer (PC), server, router, network PC, peer device or other common network node, or the like. The communication interface 735 may include a local area network (LAN), a wide area network (WAN), a cellular network, a WiFi network, a Bluetooth network, or other networks.

Computer-readable instructions stored on a computer-readable medium (e.g., the program 755 stored in the memory 710) are executable by the processor 705 of the computer 700. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 755 may implement methods disclosed herein using modules such as a flow scheduler module 760 and a flow coordinator module 765. Any one or more of the modules described herein may be implemented using hardware (e.g., a processor of a machine, ASIC, FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The flow scheduler module 760 may receive requests from vehicles for tickets to use an intersection. The flow scheduler module 760 may add the received requests to a flow queue for the intersection. Based on the flow queue, a flow conflicts table, and a flow services table, the flow scheduler module 760 may assign tickets to the requesting vehicles and update a ticket queue.

The flow coordinator module 765 may access a ticket queue for an intersection and inform vehicles when they are authorized to use the intersection. The flow coordinator module 765 may receive communications from authorized vehicles when they enter or exit the intersection. After all authorized vehicles have exited the intersection, the flow coordinator module 765 may inform the next set of vehicles that they are authorized to use the intersection.

Figure 8:
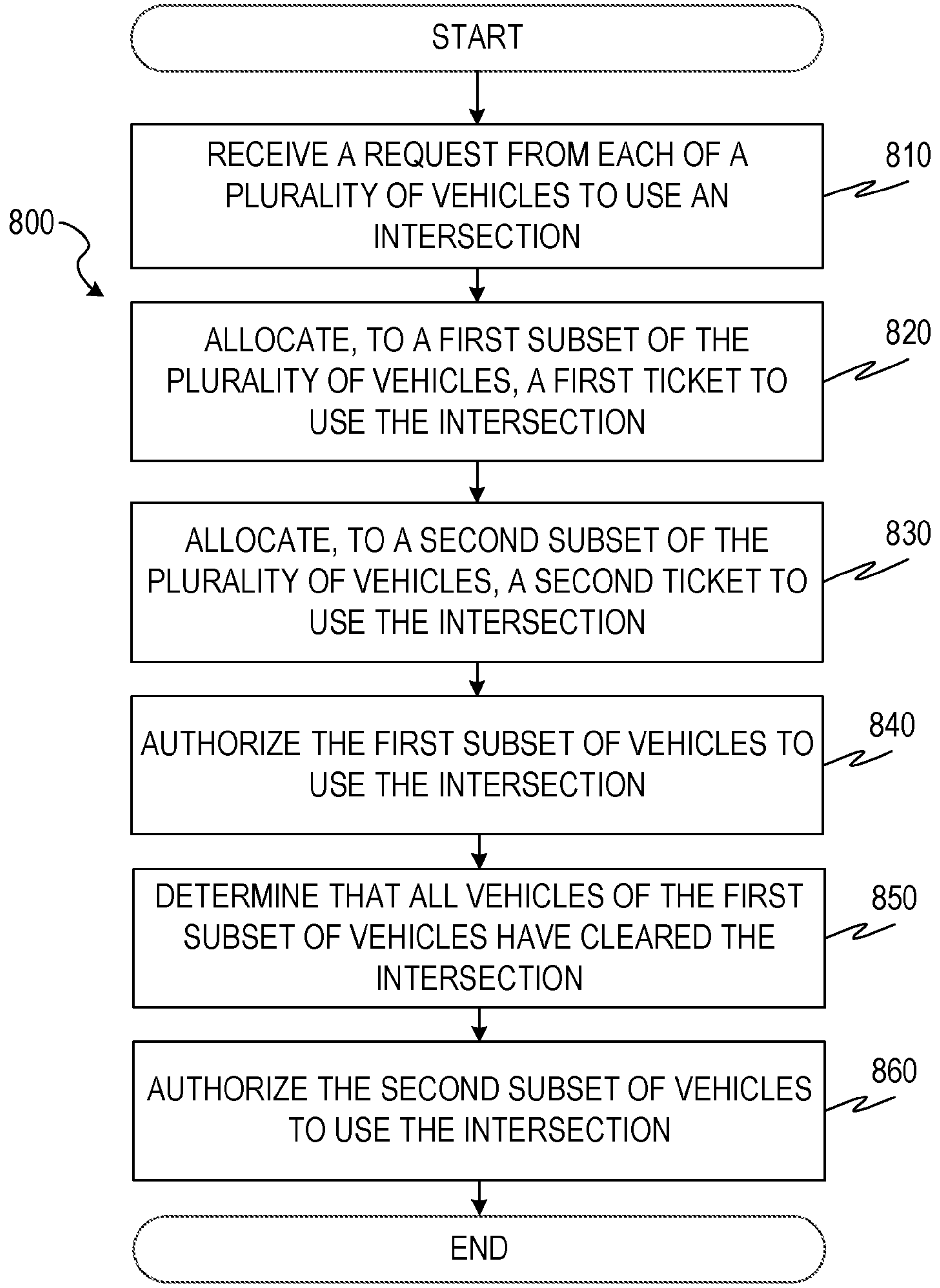
FIG. 8 is a flowchart illustration of a method of ticket-based traffic flow control at intersections for the Internet of Vehicles, according to some example embodiments.

FIG. 8 is a flowchart illustration of a method 800 of ticket-based traffic flow control at intersections for the Internet of Vehicles, according to some example embodiments. The method 800 includes operations 810, 820, 830, 840, 850, and 860. By way of example and not limitation, the operations 810-860 are described as being performed by the traffic flow controller 105 of FIG. 1, implemented in a computer 700, described with respect to FIG. 7 above.

In operation 810, the flow scheduler module 760 of the traffic flow controller 105 receives, from each of a plurality of vehicles, a request to use an intersection. For example, the vehicles may communicate with the traffic flow controller using the communication protocols of FIG. 3, sending request messages shown in FIG. 2.

In operation 820, the flow scheduler module 760 of the traffic flow controller 105 allocates, to a first subset of the plurality of vehicles, a first ticket to use the intersection. In operation 830, the flow scheduler module 760 of the traffic flow controller 105 allocates, to a second subset of the plurality of vehicles, a second ticket to use the intersection.

In some example embodiments, the pseudo-code below is used to perform operations 820 and 830.

```
// FQ is a flow queue with entries that are pairs. Each pair is a flow
identifier and a set of vehicles waiting to use the flow.
// ti is the time when the scheduler is invoked
// ticket is the next ticket identifier to be issued
// s is a sorting function that takes two items to be sorted and returns them
in sorted order
// C is the flow conflict table
// S is the flow service table
// ticket_queue is a list with entries that are pairs. Each pair is a ticket
identifier and a set of vehicle identifiers assigned the ticket.
schedule_flows(FQ, ti, ticket, s, C, S, ticket_queue):
```

-continued

```
1. blocked = { }
// actives is a list of the non-empty flow queues
2. actives = {Q_Fi|Q_Fi in FQ and Q_Fi is not empty}
3. while actives:
// CF is a list of vehicles at the front of the flow-queues, one from each
queue
4.   CF = {Q_Fi[0]|Q_Fi in actives}
5.   for vi in CF:
6.     for vj after vi in CF:
// if two flows conflict, use the sorting function to determine which to
allow and
// which to block
// example sorting algorithms include first-come, first-serve, sorting by
wait time
// shortest service time next, sorting by service time
// highest response ratio next, sorting by (wait time + service time) /
service time
7.       if C[vi.fid][vj.fid] > 0:
8.         (vx, vy) = s(vi, vj, ti, S)
9.         blocked.add(vy)
10.  CF = CF − blocked
// assign the current ticket to the vehicles at the front of their queues and
not blocked
11.  for vi in CF:
12.    vi.ticket = ticket
13.    send(admit([iid, vi.fid], vi.vid, ticket))
14.  ticket_queue.push((ticket, CF))
// prepare the data structures for the next iteration and continue
15.  ticket += 1
16.  pop CF from actives
17.  actives = {Q_Fi|Q_Fi in FQ and Q_Fi is not empty}
```

In operation 840, the flow coordinator module 765 of the traffic flow controller 105 authorizes the first subset of vehicles to use the intersection. For example, a message (e.g., the "go" message of FIG. 2) may be broadcast to all vehicles assigned the current ticket.

In operation 850, the flow coordinator module 765 of the traffic flow controller 105 determines that all vehicles with the current ticket have cleared the intersection. For example, each vehicle may send a message (e.g., the "exit" message of FIG. 2) when it leaves the intersection. The traffic flow controller may compare a list of vehicles from which exit messages have been received to a list of vehicles associated with the current ticket. If the lists are the same, all vehicles with the current ticket have cleared the intersection.

In operation 860, the flow coordinator module 765 of the traffic flow controller 105 authorizes the second subset of vehicles to use the intersection. For example, a message (e.g., the "go" message of FIG. 2) may be broadcast to all vehicles assigned the next ticket.

In some example embodiments, operations 810-830 are repeatedly performed by one process and operations 840-860 are repeatedly performed by a separate process. Thus, the process performing the operations 810-830 may be decoupled from the process performing the operations 840-860. In these example embodiments, the processes indirectly communicate via a ticket queue, such as the ticket_queue structure used in the pseudo-code described above with respect to operations 820-830. Example pseudo-code for operations 840-860 is below.

```
coordinate_vehicles(ticket_queue):
1. while ticket_queue:
// the first entry in the ticket queue is a pair that includes the current ticket
and the list of vehicles assigned the current ticket
2.   pair = ticket_queue.pop(0)
// wait until enter and exit messages indicating the current ticket have
been
received for all vehicles assigned the current ticket
```

-continued

```
3.   wait_for(([enter, exit], pair[0]), pair[1])
// send a message to the vehicles associated with the next ticket that
indicates that the vehicles should proceed through the intersection
4.   broadcast(go(iid, *, ticket_queue[0][0]))
```

Figure 9:
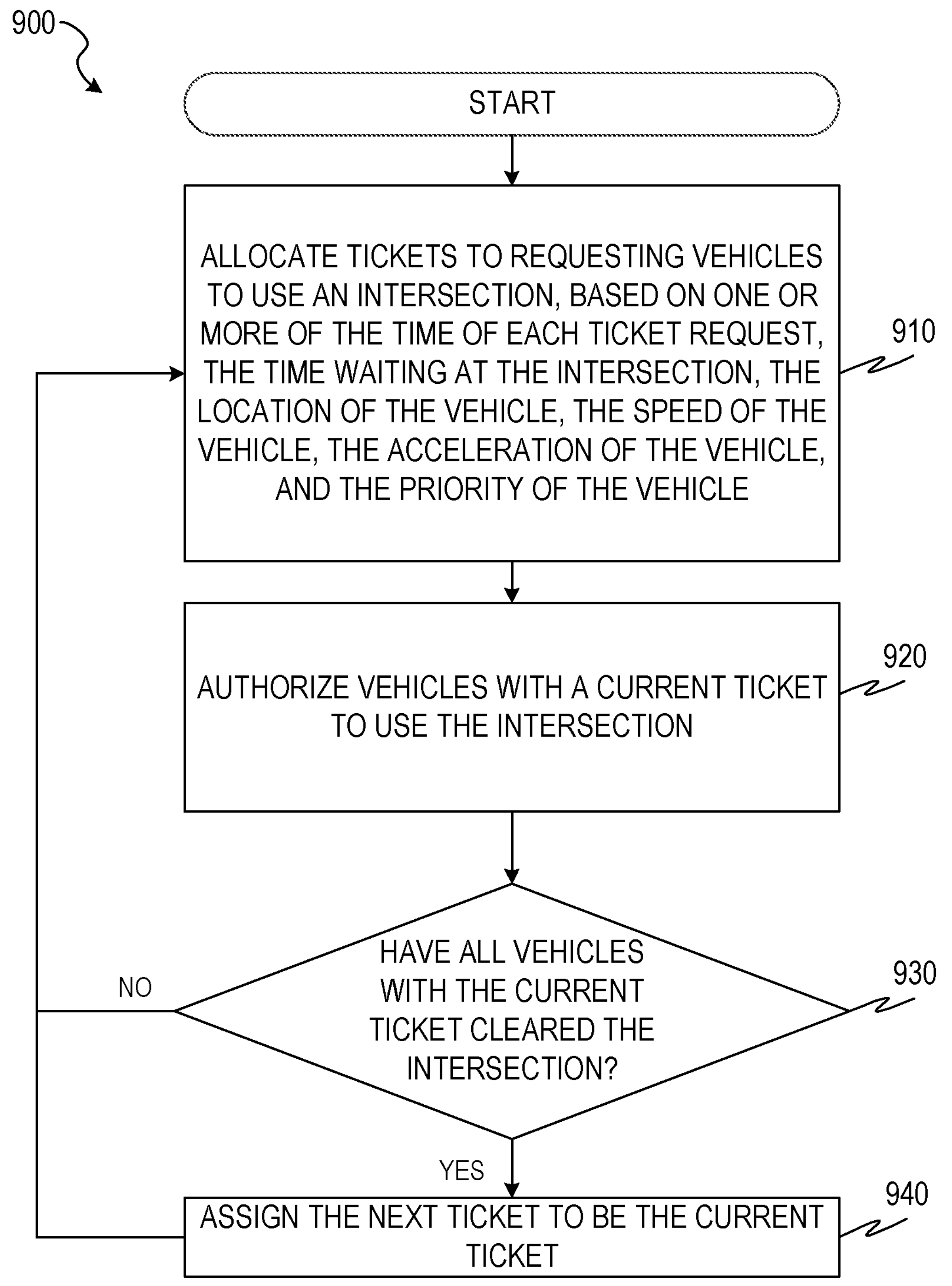
FIG. 9 is a flowchart illustration of a method of ticket-based traffic flow control at intersections for the Internet of Vehicles, according to some example embodiments.

FIG. 9 is a flowchart illustration of a method 900 of ticket-based traffic flow control at intersections for the Internet of Vehicles, according to some example embodiments. The method 900 includes operations 910, 920, 930, and 940. By way of example and not limitation, the operations 910-940 are described as being performed by the traffic flow controller of FIG. 1, implemented in a computer 700, described with respect to FIG. 7 above.

In operation 910, the flow scheduler module 760 of the traffic flow controller 105 allocates tickets to requesting vehicles to use an intersection. The allocations are based on one or more of the time of each ticket request, the time waiting at the intersection (by the vehicle, by other vehicles, or any suitable combination thereof), the location of the vehicle, the speed of the vehicle, the acceleration of the vehicle, and the priority of the vehicle. For example, the pseudo-code presented above with respect to operation 820 may be used. The sort function, s, may use any combination of the time of each ticket request, the time waiting at the intersection (by the vehicle, by other vehicles, or any suitable combination thereof), the location of the vehicle, the speed of the vehicle, the acceleration of the vehicle, and the priority of the vehicle in determining which vehicle should be granted first use of the intersection when two or more vehicles cannot use the intersection simultaneously (e.g., due to a collision if they did).

In operation 920, the flow coordinator module 765 of the traffic flow controller 105 authorizes vehicles with a current ticket to use the intersection. For example, a message (e.g., the "go" message of FIG. 2) may be broadcast to all vehicles assigned the current ticket.

In operation 930, the flow coordinator module 765 of the traffic flow controller 105 determines if all vehicles with the current ticket have cleared the intersection. For example, each vehicle may send a message (e.g., the "exit" message of FIG. 2) when it leaves the intersection. The flow coordinator module 765 may compare a list of vehicles from which exit messages have been received to a list of vehicles associated with the current ticket. If the lists are the same, all vehicles with the current ticket have cleared the intersection. In that case, the process 900 continues with operation 940. If all vehicles with the current ticket have not cleared the intersection, the process 900 continues with operation 910. In operation 940, the flow coordinator module 765 assigns the next ticket to be the current ticket and continues with operation 910.

In some example embodiments, operation 910 is repeated by one process and operations 920-940 are performed by a separate process. In these example embodiments, the processes indirectly communicate via a ticket queue, such as the ticket_queue structure used in the pseudo-code described above with respect to operations 820-830. Thus, the process performing the operation 910 may be decoupled from the process performing the operations 92-940. The example pseudo-code described above with respect to operations 840-860 may be used for operations 920-940.

Devices and methods disclosed herein may enable an intelligent transportation system to safely and efficiently direct traffic through intersections. An intelligent transportation system making use of one or more of the devices and methods disclosed herein may have one or more of improved safety, increased liveness, increased throughput, and increased fairness in comparison with prior art systems. The ticket mechanism disclosed herein may also facilitate admission control, allow vehicles to estimate their wait time, avoid potential deadlocks, and decouple the traffic flow scheduler from the traffic flow coordinator.

For example, a vehicle may monitor the messages being sent by the traffic flow controller to other vehicles and estimate a wait time until the vehicle will be authorized to use the intersection based on the current ticket, the mean time between tickets being authorized to use the intersection, the ticket assigned to the vehicle, or any suitable combination thereof.

Although the example embodiments described herein discuss the use of scheduling traffic flows of vehicles through an intersection, other uses of the invention are contemplated. For example, vehicles that need maintenance may use a repair shop flow controller to control which vehicles may simultaneously use the repair shop (or car dealership) and which need to wait. In this manner, vehicles may be directed to arrive at the repair shop only when the repair shop is able to provide service, without having to wait at the repair shop.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer-implemented method of controlling vehicle traffic through an intersection comprising:

receiving a request, by one or more processors of a traffic flow controller and from each of a plurality of vehicles, to use the intersection;

allocating, by the one or more processors of the traffic flow controller and to a first subset of the plurality of vehicles, a first ticket to use the intersection;

allocating, by the one or more processors of the traffic flow controller and to a second subset of the plurality of vehicles, a second ticket to use the intersection;

authorizing, by the one or more processors of the traffic flow controller, the first subset of the plurality of vehicles to use the intersection;

determining, by the one or more processors of the traffic flow controller, that all vehicles of the first subset of the plurality of vehicles have cleared the intersection; and authorizing, by the one or more processors of the traffic flow controller, the second subset of the plurality of vehicles to use the intersection.

2. The computer-implemented method of claim 1, wherein:

the method further comprises:

receiving, by the one or processors of the traffic flow controller, a location from each vehicle of the plurality of vehicles; and the allocating of the first ticket to the first subset of the plurality of vehicles is based on the locations of the vehicles.

3. The computer-implemented method of claim 1, wherein:

each received request has a corresponding time at which the request was received; and the allocating of the first ticket to the first subset of the plurality of vehicles is based on the times at which the requests were received.

4. The computer-implemented method of claim 1, wherein:

the method further comprises:

determining, by the one or more processors of the traffic flow controller, a wait time of each vehicle of the plurality of vehicles; and the allocating of the first ticket to the first subset of the plurality of vehicles is based on the wait times of the vehicles.

5. The computer-implemented method of claim 1, wherein:

each vehicle of the plurality of vehicles has a corresponding speed; and the allocating of the first ticket to the first subset of the plurality of vehicles is based on the speeds of the vehicles.

6. The computer-implemented method of claim 1, wherein:

each vehicle of the plurality of vehicles has a corresponding acceleration; and the allocating of the first ticket to the first subset of the plurality of vehicles is based on the accelerations of the vehicles.

7. The computer-implemented method of claim 1, wherein:

each vehicle of the plurality of vehicles has a corresponding priority; and the allocating of the first ticket to the first subset of the plurality of vehicles is based on the priorities of the vehicles.

8. The computer-implemented method of claim 1, further comprising:

receiving, by the one or more processors of the traffic flow controller, a message from each vehicle as the vehicle enters the intersection.

9. The computer-implemented method of claim 1, further comprising:

receiving, by the one or more processors of the traffic flow controller, a message from each vehicle as the vehicle exits the intersection.

10. A traffic flow controller comprising:

a memory storage comprising instructions;

one or more processors in communication with the memory storage, wherein the one or more processors execute the instructions to perform:

receiving a request, from each of a plurality of vehicles, to use an intersection;

allocating, to a first subset of the plurality of vehicles, a first ticket to use the intersection;

allocating, to a second subset of the plurality of vehicles, a second ticket to use the intersection;

authorizing the first subset of the plurality of vehicles to use the intersection;

determining that all vehicles of the first subset of the plurality of vehicles have cleared the intersection; and authorizing the second subset of the plurality of vehicles to use the intersection.

11. The traffic flow controller of claim 10, wherein:

the one or more processors further perform:

receiving a location from each vehicle of the plurality of vehicles; and the allocating of the first ticket to the first subset of the plurality of vehicles is based on the locations of the vehicles.

12. The traffic flow controller of claim 10, wherein:

each received request has a corresponding time at which the request was received; and the allocating of the first ticket to the first subset of the plurality of vehicles is based on the times at which the requests were received.

13. The traffic flow controller of claim 10, wherein:

the one or more processors further perform:

determining a wait time of each vehicle of the plurality of vehicles; and the allocating of the first ticket to the first subset of the plurality of vehicles is based on the wait times of the vehicles.

14. The traffic flow controller of claim 10, wherein:

each vehicle of the plurality of vehicles has a corresponding speed; and the allocating of the first ticket to the first subset of the plurality of vehicles is based on the speeds of the vehicles.

15. The traffic flow controller of claim 10, wherein:

each vehicle of the plurality of vehicles has a corresponding acceleration; and the allocating of the first ticket to the first subset of the plurality of vehicles is based on the accelerations of the vehicles.

16. The traffic flow controller of claim 10, wherein:

each vehicle of the plurality of vehicles has a corresponding priority; and the allocating of the first ticket to the first subset of the plurality of vehicles is based on the priorities of the vehicles.

17. The traffic flow controller of claim 10, wherein the one or more processors further perform:

receiving a message from each vehicle as the vehicle enters the intersection.

18. The traffic flow controller of claim 10, wherein the one or more processors further perform:

receiving a message from each vehicle as the vehicle exits the intersection.

19. A non-transitory computer-readable medium storing computer instructions for controlling vehicle traffic through an intersection, wherein the instructions when executed by one or more processors, cause the one or more processors to perform steps of:

receiving a request, from each of a plurality of vehicles, to use the intersection;

allocating, to a first subset of the plurality of vehicles, a first ticket to use the intersection;

allocating, to a second subset of the plurality of vehicles, a second ticket to use the intersection;

authorizing the first subset of the plurality of vehicles to use the intersection;

determining that all vehicles of the first subset of the plurality of vehicles have cleared the intersection; and authorizing the second subset of the plurality of vehicles to use the intersection.

20. The non-transitory computer-readable medium of claim 19, wherein:

the one or more processors further perform:

receiving a location from each vehicle of the plurality of vehicles; and the allocating of the first ticket to the first subset of the plurality of vehicles is based on the locations of the vehicles.

* * * * *